(12) United States Patent
Nishino et al.

(10) Patent No.: US 8,120,687 B2
(45) Date of Patent: Feb. 21, 2012

(54) SIGNAL READING METHOD, SIGNAL READING CIRCUIT, AND IMAGE SENSOR

(75) Inventors: Hironori Nishino, Kawasaki (JP); Akira Sawada, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 372 days.

(21) Appl. No.: 12/538,019

(22) Filed: Aug. 7, 2009

(65) Prior Publication Data

US 2009/0295453 A1  Dec. 3, 2009

Related U.S. Application Data

(63) Continuation of application No. PCT/JP2007/052240, filed on Feb. 8, 2007.

(51) Int. Cl.
*H04N 5/335* (2006.01)

(52) U.S. Cl. ........ 348/308; 348/294; 348/297; 348/304; 348/320; 250/208.1

(58) Field of Classification Search .............. 348/295, 348/297, 303, 304, 320, 300
See application file for complete search history.

(56) References Cited

U.S. PATENT DOCUMENTS

| | | | | |
|---|---|---|---|---|
| 6,040,568 A * | 3/2000 | Caulfield et al. | ........... | 250/208.1 |
| 6,078,037 A * | 6/2000 | Booth, Jr. | ........... | 250/208.1 |
| 6,885,002 B1 * | 4/2005 | Finch et al. | ........... | 250/332 |
| 6,975,356 B1 * | 12/2005 | Miyamoto | ........... | 348/308 |
| 7,205,522 B2 * | 4/2007 | Krymski | ........... | 250/208.1 |
| 7,408,210 B2 * | 8/2008 | Ogura et al. | ........... | 257/233 |
| 2003/0010896 A1 | 1/2003 | Kaifu et al. | | |
| 2006/0170491 A1 * | 8/2006 | Wany et al. | ........... | 330/4.9 |

FOREIGN PATENT DOCUMENTS

| JP | 04-373273 A | 12/1992 |
|---|---|---|
| JP | 2003-009003 A | 1/2003 |
| JP | 2003-134396 A | 5/2003 |
| JP | 2006-014866 A | 2/2006 |
| JP | 2006-505159 A | 2/2006 |

* cited by examiner

*Primary Examiner* — Jason Chan
*Assistant Examiner* — Abdelaaziz Tissire
(74) *Attorney, Agent, or Firm* — Arent Fox, LLP

(57) ABSTRACT

A signal reading method successively outputs a read signal by scanning a voltage value of an integrating capacitor in an image sensor in which a plurality of sensor parts are arranged in a two-dimensional array made up of rows and columns and each sensor part includes the integrating capacitor accumulating a charge obtained by integrating a photocurrent output from a sensor. A first integration of the photocurrent using the integrating capacitor and a first sampling and holding using a sample and hold capacitor are performed in a first time interval, during a time of one frame made up of the first through third time intervals. A second integration of the photocurrent using the integrating capacitor is performed in the second time interval, and processes in the first and second time intervals are performed in common with respect to all of the sensor parts simultaneously. A vertical scan is started by selecting the row in an order starting from a first row.

17 Claims, 6 Drawing Sheets

SIGNAL READING METHOD, SIGNAL READING CIRCUIT, AND IMAGE SENSOR

CROSS-REFERENCE TO RELATED APPLICATIONS

This application is a continuation application filed under 35 U.S.C. 111(a) claiming the benefit under 35 U.S.C. 120 and 365(c) of a PCT International Application No. PCT/JP2007/052240 filed on Feb. 8, 2007, in the Japanese Patent Office, the disclosure of which is hereby incorporated by reference.

FIELD

The present invention generally relates to signal reading methods, signal reading circuits and image sensors (or image pickup devices), and more particularly to a signal reading method and a signal reading circuit which read detected information from a plurality of sensors by converting current signals from the plurality of sensors, and to an image sensor having such a signal reading circuit.

BACKGROUND

A conventional image sensor has a structure in which sensors that generate photocurrent signals depending on amounts of incident light are arranged in a two-dimensional array. Each sensor generates a current change as a signal component, and a signal reading circuit accumulates a charge of the current signal from each of the sensors, converts the current signal into a voltage, and successively outputs a read signal by scanning the voltage value.

FIG. 1 is a circuit diagram illustrating a part of an example of the conventional image sensor. FIG. 1 illustrates the signal reading circuit of the image sensor. In FIG. 1, each sensor part 1 has the same structure including a sensor 2, an input gate 3, a capacitance reset switch 4, and an integrating capacitor 5. An input part 11 includes the sensor part 1, an output amplifier 12, and a row selection switch 13. An external gate control signal PIG is input to a gate of the input gate 3, and an external reset signal Rst is input to a gate of the capacitance reset switch 4. A gate of the row selection switch 13 is connected to a vertical scan shift register 21. A power supply voltage VD is applied to the output amplifier 12. An external bias voltage VB is applied to a gate of a switch 15, and the output amplifier 12 and the row selection switch 13 are connected to an output line via a column selection switch 16. A gate of the column selection switch 16 is connected to a horizontal shift register 22. In FIG. 1, GND denotes a ground voltage, and an output voltage V(out) is output from an output terminal 25. In addition, the signal reading circuit may have a structure including the sensor 2 or, may have a structure excluding the sensor 2.

An amount of current of a photocurrent generated from the sensor 2 is converted into an amount of charge accumulated in the integrating capacitor 5 by turning ON the input gate 3 for a predetermined time by the external gate control signal PIG. A resulting voltage that is introduced across both terminals of the integrating capacitor 5 is regarded as a read signal. The output voltages (or read signals) that are generated from each of the sensor parts 1 that are arranged in the two-dimensional array are scanned time-sequentially by selecting the row selection switch 12 and the column selection switch 16 in an order using the vertical scan shift register 21 and the horizontal scan shift register 22. The scanned output voltages (or read signals) are successively output via the output terminal 25 to the outside as the output voltage V(out).

In the signal reading circuit illustrated in FIG. 1, the photocurrent from the sensor 2 is integrated as an amount of charge, and thus, the signal is proportional to $C^1$ while the noise is proportional to $C^{1/2}$, where C denotes the amount of charge. For this reason, the Signal to Noise Ratio (SNR) of the output of each sensor part 1 becomes larger as the amount of charge that can be accumulated in the integrating capacitor 5 becomes larger. Hence, the SNR improves as the capacitance of the integrating capacitor 5 within the sensor part 1 increases. However, in the case where the sensor parts 1 are arranged in the two-dimensional array, the area that may be occupied by the circuit part within the sensor part 1 becomes limited depending on the design conditions of the image sensor, and thus, there is a limit to improving the SNR of the output obtained from the signal reading circuit. In other words, in order to improve the SNR of the output obtained from the signal reading circuit, it is desirable to make the integrating capacitor 5 large, but at the same time, it is desirable to reduce the area occupied by the circuit part within the sensor part 1. Therefore, improving the SNR and reducing the area occupied by the circuit part within the sensor part 1 are in a tradeoff relationship.

SUMMARY

Accordingly, it is an object in one aspect of the invention to provide a signal reading method, a signal reading circuit, and an image sensor, in which the SNR of an output obtained from the signal reading circuit can be improved using a relatively simple structure without increasing the area occupied by the signal reading circuit.

One aspect of the present invention is to provide a signal reading method for successively outputting a read signal by scanning a voltage value of an integrating capacitor in an image sensor in which a plurality of sensor parts are arranged in a two-dimensional array made up of rows and columns and each sensor part includes the integrating capacitor accumulating a charge obtained by integrating a photocurrent output from a sensor, said signal reading method comprising carrying out a first integration of the photocurrent using the integrating capacitor and a first sampling and holding using a sample and hold capacitor in a first time interval, during a time of one frame made up of the first through third time intervals; carrying out a second integration of the photocurrent using the integrating capacitor in the second time interval, and carrying out processes in the first and second time intervals in common with respect to all of the sensor parts simultaneously; and starting a vertical scan by selecting the row in an order starting from a first row, resetting the sample and hold capacitor in a predetermined row from which the read signal is already output, carrying out a second sampling and holding using the sample and hold capacitor in the predetermined row, averaging a voltage across both terminals of the sample and hold capacitor in the selected row and a voltage across both terminals of the sample and hold capacitor in the predetermined row, and starting a horizontal scan by selecting the column starting from a first column, in the third time interval, in order to successively read a final output voltage with respect to the selected column.

According to one aspect of the present invention, there is provided a signal reading circuit for an image sensor, comprising a circuit configured to successively output a read signal by scanning a voltage value of an integrating capacitor in the image sensor in which a plurality of sensor parts are arranged in a two-dimensional array made up of rows and columns and each sensor part includes the integrating capacitor accumulating a charge obtained by integrating a photocurrent output from a sensor, each of the sensor parts comprising a sample and hold capacitor; a first switch configured to couple the sample and hold capacitor to a predetermined potential; a second switch configured to control coupling between the integrating capacitor and the sample and hold capacitor within the same sensor part; a third switch configured to control coupling between the integrating capacitor and a sample and hold capacitor within a sensor part of a row different from a row in which the integrating capacitor is provided; and a fourth switch configured to mutually couple the integrating capacitor and a plurality of sample and hold capacitors via the first and second switches.

According to one aspect of the present invention, there is provided an image sensor comprising a plurality of sensor parts arranged in a two-dimensional array made up of rows and columns, each of the sensor parts including an integrating capacitor accumulating a charge obtained by integrating a photocurrent output from a sensor; and a signal reading circuit configured to successively output a read signal by scanning a voltage value of the integrating capacitor in the image sensor, each of the sensor parts comprising a sample and hold capacitor; a first switch configured to couple the sample and hold capacitor to a predetermined potential; a second switch configured to control coupling between the integrating capacitor and the sample and hold capacitor within the same sensor part; a third switch configured to control coupling between the integrating capacitor and a sample and hold capacitor within a sensor part of a different row which is different from a row in which the integrating capacitor is provided; and a fourth switch configured to mutually couple the integrating capacitor and a plurality of sample and hold capacitors via the first and second switches, wherein an output voltage representing a dynamic image is output by repeating a process of successively outputting the read signal by scanning the voltage value of the integrating capacitor in a time of one frame.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

Preferred embodiments of the present invention will be described with reference to the accompanying drawings.

A description will now be given of the signal reading method, the signal reading circuit, and the image sensor in each embodiment according to the present invention.

First Embodiment

Figure 2:
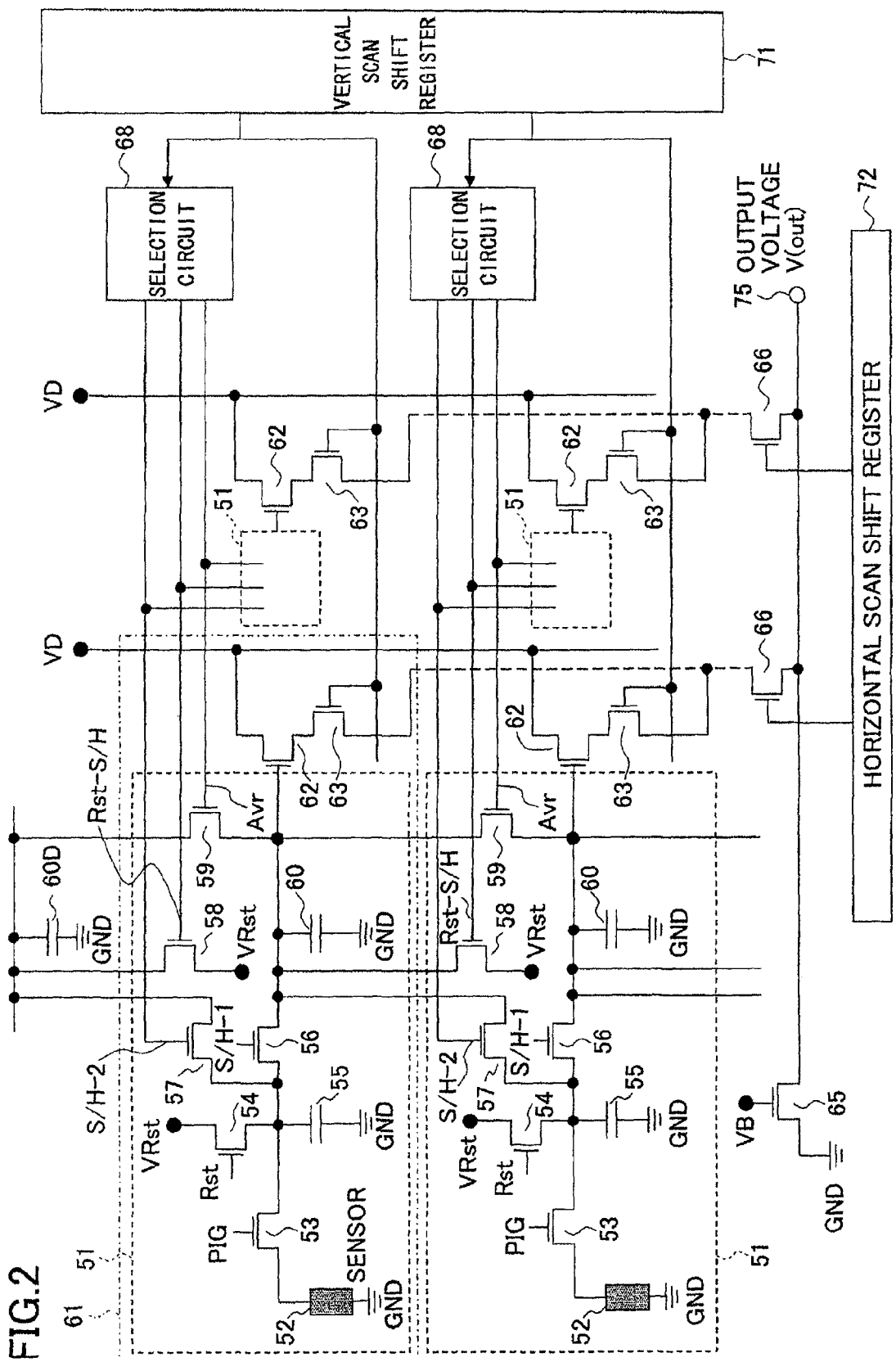
FIG. 2 is a circuit diagram illustrating a part of an image sensor in a first embodiment of the present invention.
Figure 3:
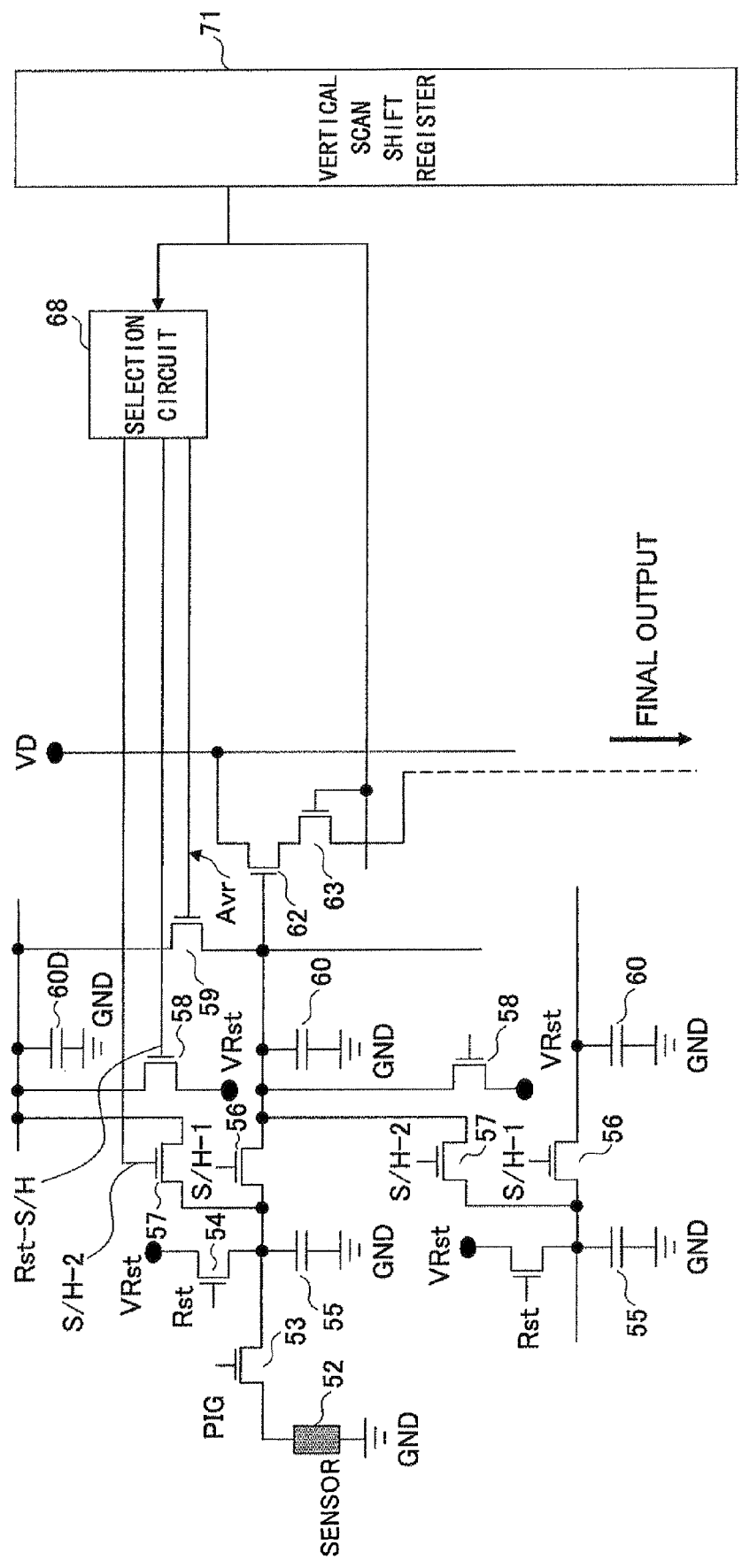
FIG. 3 is a circuit diagram for explaining an operation of the image sensor in the first embodiment.

FIG. 2 is a circuit diagram illustrating a part of an image sensor in a first embodiment of the present invention, that is, a signal reading circuit in the first embodiment. In FIG. 3, each sensor part 51 has the same structure including a sensor 52, an input gate 53, a capacitance reset switch 54, an integrating capacitor 55, sample and hold switches 56 and 57, a sample and hold reset switch 58, a connection switch 59, and a sample and hold capacitor 60. An input part 61 includes the sensor part 51, an output amplifier 62, and a row selection switch 63. Two or more sensor parts 51 are provided in each of the rows extending in the horizontal direction. In addition, two or more sensor parts 51 are provided in each of the columns extending in the vertical direction. The number of sensor parts 51 provided in each row and the number of sensor parts 51 provided in each column may be the same or, may be different.

An external gate control signal PIG is input to a gate of the input gate 53, and an external reset signal Rst is input to a gate of the capacitance reset switch 54. A gate of the row selection switch 63 is connected to a vertical scan shift register 71. The gates, that is, control signal lines of the row selection switches 63 that are provided in the same row are connected in common. A power supply voltage VD is applied to the output amplifier 62. An external bias voltage VB is applied to a gate of a switch 65, and the output amplifier 62 and the row selection switch 63 are connected to a horizontal scan shift register 72 via a column selection switch 66. An external sample and hold signal S/H-1 is input to a gate of the sample and hold switch 56. Gates, that is, control signal lines of the sample and hold switches 56 within the sensor parts 51 that are provided in the same row are connected in common. A sample and hold signal S/H-2, a sample and hold reset signal Rst-S/H, and a connection control signal Avr from the perpendicular scan shift register 71 are respectively input to the sample and hold switch 57, the sample and hold reset switch 58, and a gate of the connection switch 59, via a selection circuit 68. In FIG. 2, GND denotes a ground voltage, VRst denotes a reset power supply voltage, and an output voltage V(out) is output via an output terminal 75. The signal reading circuit may have a structure including the sensor 52 or, may have a structure excluding the sensor 52.

The integrating capacitor 55 and the sample and hold capacitor 60 are connected via the sample and hold switches 56 and 57. The sample and hold switches 56 and 57 are connected to the reset power supply voltage VRst via the sample and hold reset switch 58. The sample and hold switch 56 is provided make a connection to the sample and hold capacitor 60 within the same sensor part 51 as the integrating capacitor 55, and the sample and hold switch 57 is provided to make a connection to the sample and hold capacitor 60 within a sensor part 51 different from the sensor part 51 in which the integrating capacitor 55 is provided. The connection switch 59 is provided to connect a plurality of pairs of sample and hold capacitors 60 that are connected to one integrating capacitor 55 via the pair of sample and hold switches 56 and 57. In FIG. 2, a dummy sample and hold capacitor 60D is provided with respect to a dummy row that is provided above the sensor part 51 arranged in the first row (or uppermost row). Each row is provided within an effective pixel region in which an image is detectable by the image sensor, however, the dummy row is provided outside the effective pixel region (that is, outside a layout of the two-dimensional array of the sensor parts). The sample and hold capacitors 60 and 60D have capacitances that are sufficiently small compared to that of the integrating capacitor 55, and is approximately 1/10 the capacitance of the integrating capacitor 55, for example. In this embodiment, the sample and hold capacitors 60 and 60D have the same capacitance.

A plurality of input parts 61, each including the sensor part 51 having the structure described above, are arranged in the two-dimensional array. In addition, operations of a switch group formed by the plurality of sample and hold switches 56, a switch group formed by the plurality of sample and hold switches 57, a switch group formed by the plurality of sample and hold reset switches 58, and a switch group formed by the plurality of connection switches 59 are controlled from the vertical scan shift register 71 by turning ON and turning OFF the switch groups in units of rows, for example, via the selection circuit 68.

Next, a description will be given of the operation of the signal reading circuit by noting on the sensor 52 which corresponds to a specific pixel within the image detected by the image sensor, by referring to FIGS. 3 and 4. FIG. 3 is a circuit diagram for explaining the operation of the image sensor in the first embodiment, and FIG. 4 is a flow chart for explaining the signal reading method in the first embodiment.

Figure 4:
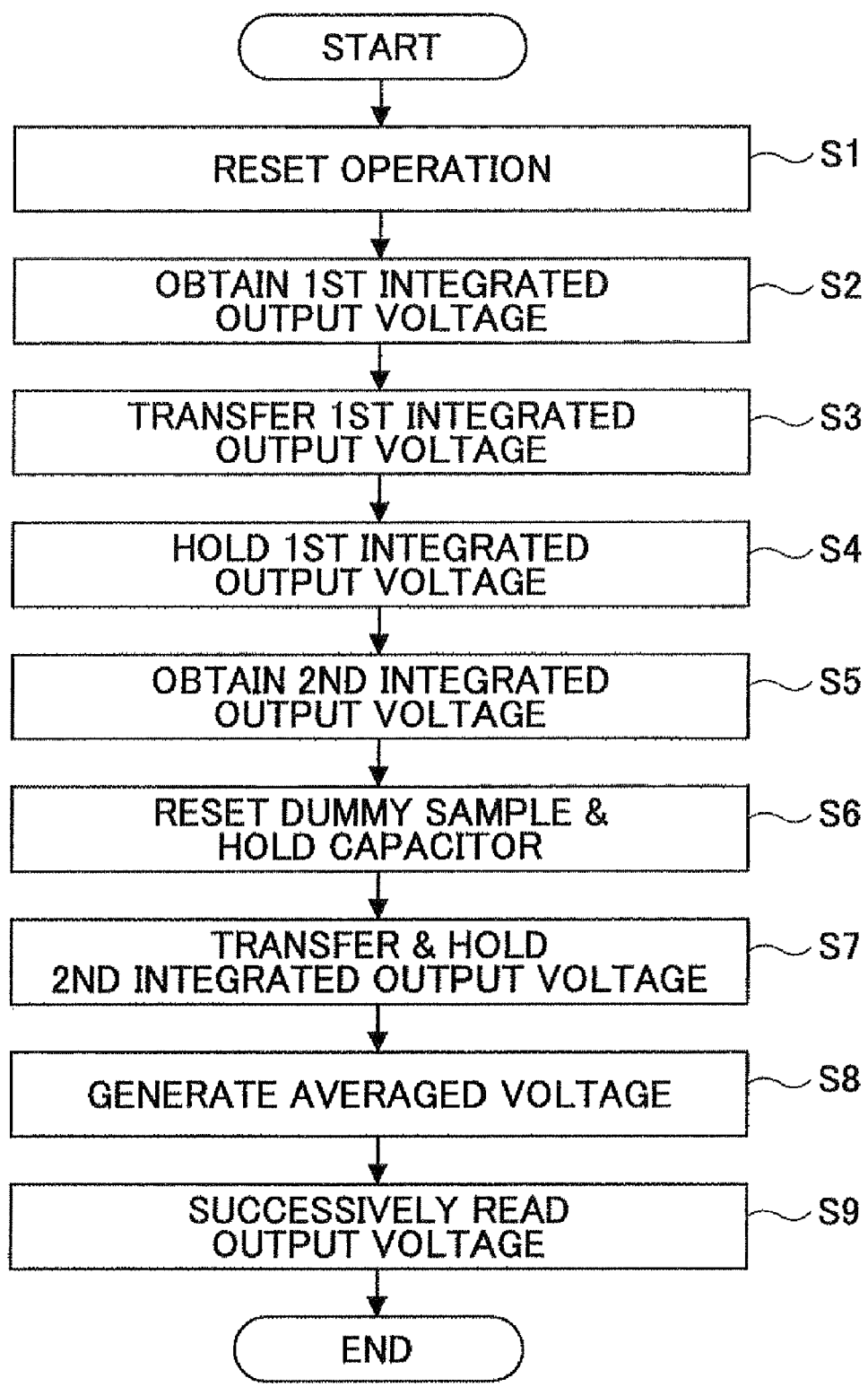
FIG. 4 is a flow chart for explaining a signal reading method in the first embodiment.

First, a step S1 in FIG. 4 carries out a reset operation in which the reset switch 54 is turned ON by the external reset signal Rst in order to set a predetermined reset voltage VRst in the integrating capacitor 55, and the sample and hold switch 56 is turned ON by the external sample and hold signal S/H-1 in order to set the reset voltage VRst to all of the sample and hold capacitors 60 and the dummy sample and hold capacitor 60D.

A step S2 turns the reset switch 54 OFF by the external reset signal Rst, turns the sample and hold switch 56 OFF by the external sample and hold signal S/H-1, and turns the input gate 530N for a predetermined time by the external gate control signal PIG, in order to accumulate in the integrating capacitor 55 the charge that is obtained by integrating the photocurrent from the sensor 52. As a result, a first integrated output voltage, that is, an integrated output voltage for the first round, is obtained.

After the predetermined time in the step S2 described above, a step S3 turns the input gate 53 OFF by the external gate control signal PIG, and turns the sample and hold switch 560N by the external sample and hold signal S/H-1, in order to transfer the voltage (first integrated output voltage) across both terminals of the integrating capacitor 55 to the sample and hold capacitor 60. Because the sample and hold capacitor 60 has the capacitance that is sufficiently small compared to that of the integrating capacitor 55, the voltage across both terminals of the sample and hold capacitor 60 is approximately the same as the voltage across both terminals of the integrating capacitor 55. In other words, the charge held in the integrating capacitor 55 is simply partially transferred to the sample and hold capacitor 60, and thus, the SNR at the sample and hold capacitor 60 is the same as the SNR at the integrating capacitor 55 at the end of the integrating operation. The first integration and sample and hold operation ends by carrying out the processes described above.

A step S4 turns the reset switch 54 ON by the external reset signal Rst, and turns the sample and hold switch 56 ON by the external sample and hold signal S/H-1, in order to reset the integrating capacitor 55 to the reset voltage VRst and to hold the first integrated output voltage in the sample and hold "capacitor 60".

A step S5 turns the reset switch 54 OFF by the external reset signal Rst, and turns the input gate 530N for the predetermined time described above by the external gate control signal PIG, in order to accumulate in the integrating capacitor 55 the charge that is obtained by integrating the photocurrent from the sensor 52. As a result, a second integrated output voltage, that is, an integrated output voltage for the second round, is obtained.

The processes of the steps S1 through S5 are simultaneously carried out with respect to all pixels of the image sensor, that is, with respect to all of the sensor parts 51.

After the predetermined time in the step S5 described above, a step S6 turns the input gate 53 OFF by the external gate control signal PIG, and turns the sample and hold reset switch 58 OFF by the reset signal Rst-S/H that is obtained from the vertical scan shift register 71 via the selection circuit 68, in order to reset the dummy sample and hold capacitor 60D to the reset voltage VRst.

A step S7 turns the sample and hold reset switch 58 OFF by the reset signal Rst-S/H that is obtained from the vertical scan shift register 71 via the selection circuit 68, and turns the sample and hold switch 570N by the sample and hold signal S/H-2 that is obtained from the vertical scan shift register 71 via the selection circuit 68, in order to transfer to the sample and hold capacitor 60 the voltage (second integrated output voltage) across both terminals of the integrating capacitor 55 to the sample and hold capacitor 60. Because the first integrating operation and the second integrating operation are the same, the integrated output voltages transferred to the sample and hold capacitor 60 and the dummy sample and hold capacitor 60D are the same on the average. Further, random noise is multiplexed to each of the integrated output voltages.

A step S8 turns the connection switch 59 ON by the connection control signal Avr that is obtained from the vertical scan shift register 71 via the selection circuit 68, and connects the sample and hold capacitor 60 and the dummy sample and hold capacitor 60D, in order to generate an average voltage of the integrated output voltages that are sampled and held by the sample and hold capacitor 60 and the dummy sample and hold capacitor 60D. This means that the voltage signal having the same SNR is integrated two times. As described above, the SNR of the integrated output voltage sampled and held by the sample and hold capacitor 60 and the SNR of the integrated output voltage sampled and held by the dummy sample and hold capacitor 60D are both equal to the SNR at the integrating capacitor 55 at the end of the integrating operation. Hence, the voltage signal held in the sample and hold capacitor 60 maintains the absolute value (S) of the average voltage signal, but the noise of the held voltage signal has been reduced to $(1/2)^{0.5}$ times.

A step S9 successively reads the output voltage of the sample and hold capacitor 60 in the selected row, and the SNR of the final output of the signal reading circuit is improved. The output voltages (or read signals) generated from each of the sensor parts 51 arranged in the two-dimensional array are scanned time-sequentially by selecting the row selection switch 62 and the column selection switch 66 in an order using the vertical scan shift register 71 which receives external data in accordance with a vertical scan pattern and the horizontal scan shift register 72 which receives external data in accordance with a horizontal scan pattern. The scanned output voltages (or read signals) are successively output via the output terminal 75 to the outside as the output voltage V(out). The operation itself of inputting the data in accordance with the vertical scan pattern to the vertical scan shift register 71 and inputting the data in accordance with the horizontal scan pattern in order to select the row and the column, and scanning the output voltages of the sensor parts 51 (that is, the pixel data of the image sensor), is known, and a description thereof will be omitted in this specification.

The processes of the steps S6 through S9 are carried out with respect to the pixels of the image sensor in units of rows, that is, with respect to each of the rows of all of the sensor parts 51. The dummy sample and hold capacitor 60D is used for the first round, but for the Nth (N is a natural number greater than or equal to two) and subsequent rounds, it is of course possible to use the unused sample and hold capacitor 60 in the (N−1)th and subsequent rows as the dummy sample and hold capacitor 60D.

The signal information (output obtained by sampling and holding the first integrated output voltage of the sensor part 51 in the first row) within the dummy sample and hold capacitor 60D is lost by the reset operation of the sample and hold reset switch 58 that is responsive to the reset signal Rst-S/H immediately before the second sample and hold operation. Accordingly, the series of operations including "turning ON the sample and hold reset switch 58"→"turning ON the sample and hold switch 57"→"turning ON the connection switch 59"→"reading the output voltage of the sensor part 51" is carried out in an order in units of rows selected by the vertical scan shift register 71. For this reason, in order to enable each of the switches 57 through 59 to be simultaneously turned ON or OFF in units of rows, the gates, that is, the control signal lines of the sample and hold switches 57 provided in the same row are connected in common, and the gates, that is, the control signal lines of the connection switches 59 provided in the same row are connected in common. As a result, it is possible to sample and hold the second integrated output voltage, that is, the integrated output voltage for the second round, by utilizing the sample and hold capacitor 60 within the sensor part 51 of the row for which the scanning and reading has already ended with respect to the output voltage with the improved SNR. The signal information within the sample and hold capacitor 60 is lost after the final output voltage has been read, and this holds true for all of the sensor parts 51. Therefore, it is possible to improve the SNR with respect to all of the sensor parts 51 (that is, all pixels) of the image sensor.

Second Embodiment

Figure 5:
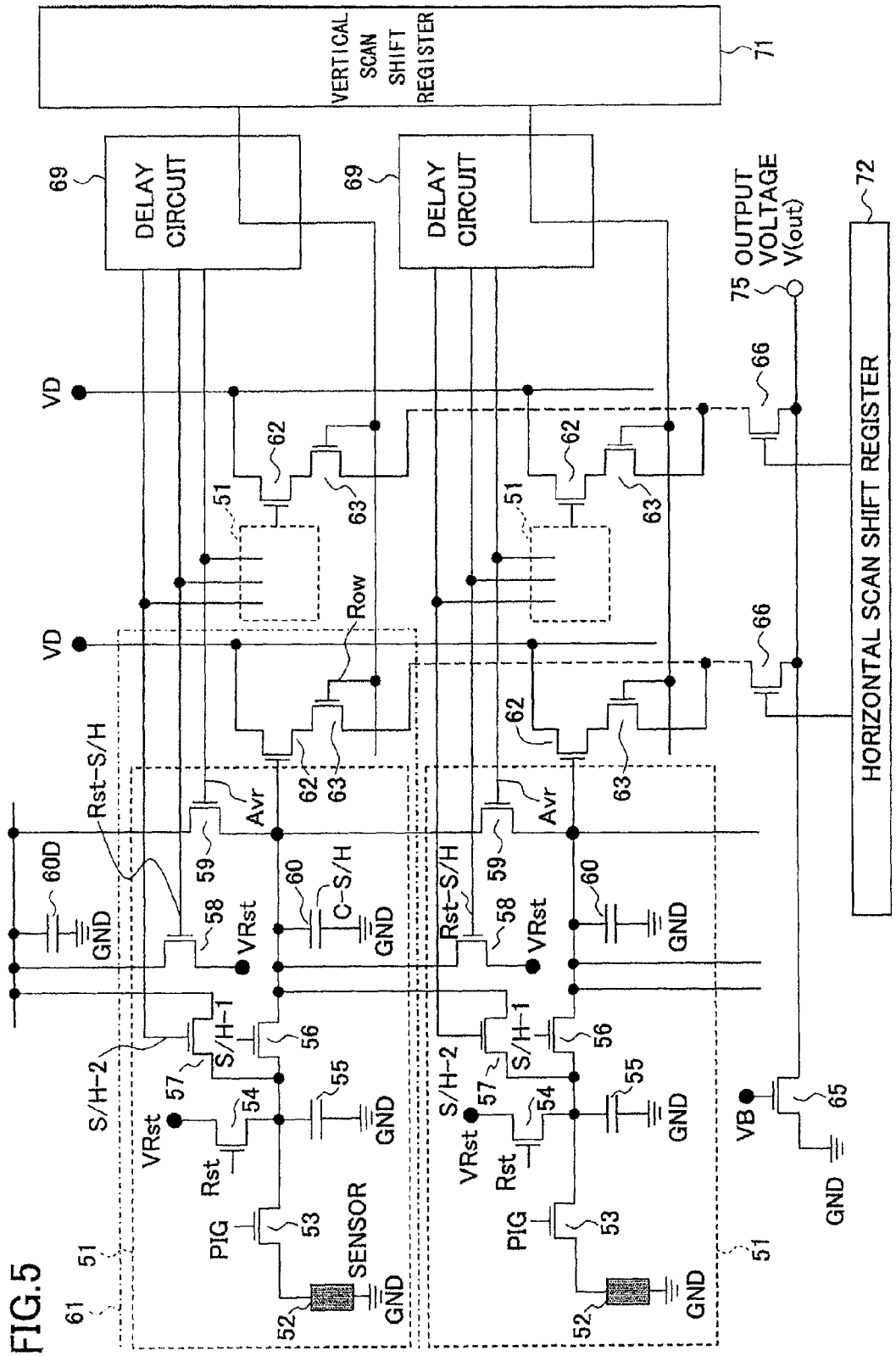
FIG. 5 is a circuit diagram illustrating a part of the image sensor in a second embodiment of the present invention.
Figure 6:
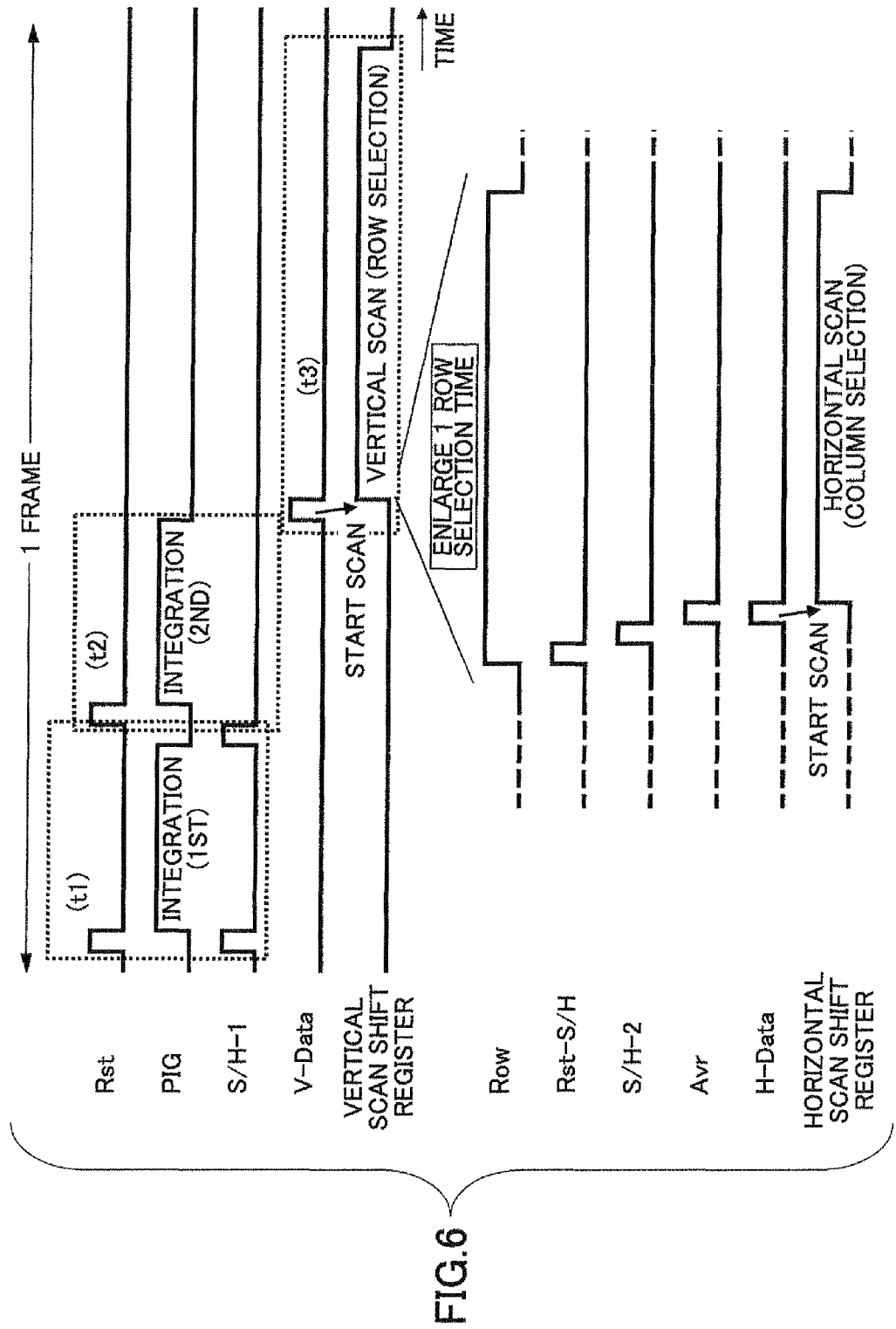
FIG. 6 is a timing chart for explaining the operation of the image sensor in the second embodiment.

FIG. 5 is a circuit diagram illustrating a part of the image sensor in a second embodiment of the present invention, that is, a signal reading circuit in the second embodiment. FIG. 6 is a timing chart for explaining the operation of the image sensor in the second embodiment. In this second embodiment, the image sensor and the signal reading circuit employ the signal reading method in accordance with the second embodiment.

In FIG. 5, those parts that are the same as those corresponding parts in FIG. 2 are designated by the same reference numerals, and a description thereof will be omitted. In this embodiment, a delay circuit 69 is provided in place of the selection circuit 68, as may be seen from FIG. 5. The delay circuit 69 delays data input to the vertical scan shift register 71 in order to generate the sample and hold reset signal Rst-S/H, the sample and hold signal S/H-2 and the connection control signal Avr for controlling the ON and OFF states of the switches 58, 57 and 59. Each of the switches 53, 54, 56 through 59, 62, 63, 65 and 66 is formed by a CMOS transistor.

An upper half of FIG. 6 illustrates the vertical scan timing in a time of one frame, and a lower half of FIG. 6 illustrates the horizontal scan timing in a time in which one row is selected on a time base that is expanded compared to the time base in the upper half of FIG. 6. The upper half of FIG. 6 illustrates the reset signal Rst input to the gate of the reset switch 54, the gate control signal PIG input to the input gate 53, the sample and hold signal S/H-1 input to the gate of the sample and hold switch 56, data V-Data of the vertical scan pattern input to the vertical scan shift register 71, and a vertical scan time (or row selection time) of the vertical scan shift register 71. On the other hand, the lower half of FIG. 6 illustrates a row selection signal Row input to the gate of the row selection switch 63, the sample and hold reset signal Rst-S/H input to the gate of the sample and hold reset switch 58, the sample and hold signal S/H-2 input to the gate of the sample and hold switch 57, the connection control signal Avr input to the gate of the connection control switch 59, data H-Data of the horizontal scan pattern input to the horizontal scan shift register 72, and a horizontal scan time (or column selection time) of the horizontal scan shift register 72.

In FIG. 6, the integration of the photocurrent signal of the first round and the sampling and holding of the first round are carried out in a time interval (t1). The integration of the photocurrent signal of the second round is carried out in a next time interval (t2). The processes during the time interval (t1) and the time interval (t2) are carried out in common with respect to all of the sensor parts 51 (that is, all pixels) simultaneously. In a next time interval (t3), the scan operation of the vertical scan shift register 71 is started to select the row in an order starting from the first row (or uppermost row), and the following processes ST1 through ST4 are successively carried out with respect to the selected row.

The process ST1 resets the sample and hold capacitor 60 within the sensor part 51 of a predetermined row for which the output voltage has already been output via the output terminal 75, such as the sensor part 51 in a row preceding the selected row in the scanning order (for example, a row immediately preceding the selected row).

The process ST2 carries out the sampling and holding of the second round using the sample and hold capacitor 60 within the sensor part 51 of the predetermined row.

The process ST3 averages the voltage across both terminals of the sample and hold capacitor 60 within the sensor part 51 of the selected row and the voltage across both terminals of the sample and hold capacitor 60 within the sensor part 51 of the predetermined row.

The process ST4 starts the scan operation of the horizontal scan shift register 72 and selects the column in an order starting from the first column (or left most column), and successively reads the final output voltage with respect to the selected column.

When the processes ST1 through ST4 described above are completed with respect to the last row (or lowermost row), it means that the reading of the output voltage with respect to all of the sensor parts 51 (or all pixels) has ended. By repeating the above described processes within the time of one frame, it is possible to obtain the output voltage (or image data) representative of the dynamic image detected by the image sensor.

Figure 1:
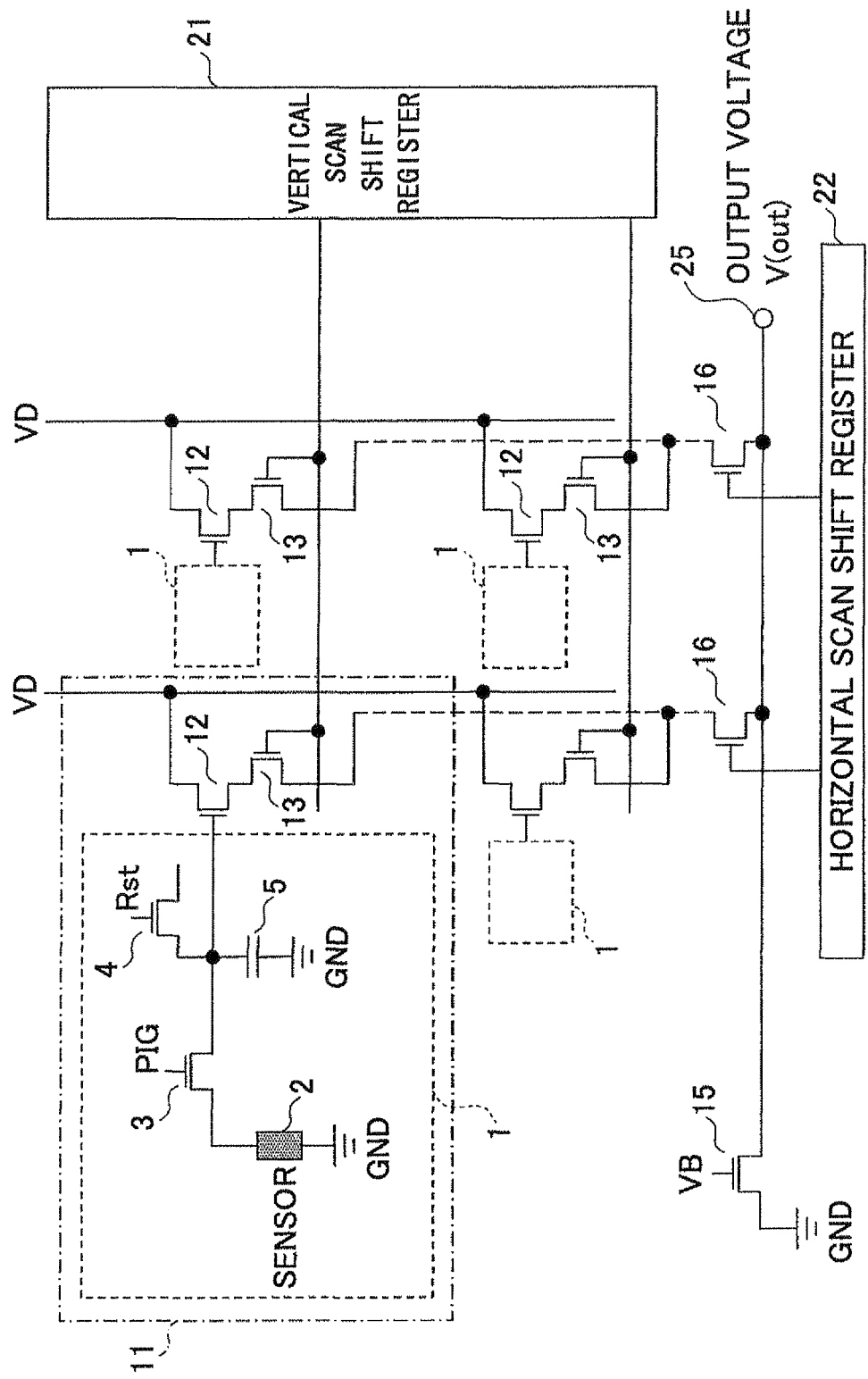
FIG. 1 is a circuit diagram illustrating a part of an example of the conventional image sensor.

The SNR of the output voltage obtained from the signal reading circuit of this embodiment is improved by approximately $2^{0.5}$ times compared to the SNR of the output voltage obtained from the conventional signal reading circuit illustrated in FIG. 1. In addition, in order to obtain the output voltage from the conventional signal reading circuit with the SNR that is comparable to that obtained by the signal reading circuit of this embodiment, it would be necessary to double the capacitance of the integrating capacitor, and the area occupied by the circuit part within the sensor part and thus the area occupied by the entire signal reading circuit would become considerable large. On the other hand, in this embodiment, it is possible to improve the SNR of the output voltage obtained from the signal reading circuit without greatly increasing the area occupied by the circuit part within the sensor part 51 and without increasing the area occupied by the entire signal reading circuit.

The embodiments described above are of course applicable to various kinds of image sensors, including Charge Coupled Device (CCD) image sensors and infrared image sensors, for example.

All examples and conditional language recited herein are intended for pedagogical purposes to aid the reader in understanding the invention and the concepts contribute by the inventor to furthering the art, and are to be construed as being without limitation to such specifically recited examples and conditions, nor does the organization of such examples in the specification related to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A signal reading method for successively outputting a read signal by scanning a voltage value of an integrating capacitor in an image sensor in which a plurality of sensor parts are arranged in a two-dimensional array made up of rows and columns and each sensor part includes the integrating capacitor accumulating a charge obtained by integrating a photocurrent output from a sensor, said signal reading method comprising:

carrying out a first integration of the photocurrent using the integrating capacitor and a first sampling and holding using a sample and hold capacitor in a first time interval, during a time of one frame made up of the first through third time intervals;

carrying out a second integration of the photocurrent using the integrating capacitor in the second time interval, and carrying out processes in the first and second time intervals in common with respect to all of the sensor parts simultaneously; and starting a vertical scan by selecting the row in an order starting from a first row, resetting the sample and hold capacitor in a predetermined row from which the read signal is already output, carrying out a second sampling and holding using the sample and hold capacitor in the predetermined row, averaging a voltage across both terminals of the sample and hold capacitor in the selected row and a voltage across both terminals of the sample and hold capacitor in the predetermined row, and starting a horizontal scan by selecting the column starting from a first column, in the third time interval, in order to successively read a final output voltage with respect to the selected column.

2. The signal reading method as claimed in claim 1, wherein the predetermined row with respect to the first row is formed by a dummy row provided outside an effective pixel region of the image sensor, and the predetermined row with respect to the second and subsequent rows is formed by a row preceding the selected row in a scanning order.

3. The signal reading method as claimed in claim 1, wherein timings of said resetting the sample and hold capacitor in the predetermined row, said carrying out the second sampling and holding using the sample and hold capacitor in the predetermined row, and said averaging the voltage across both terminals of the sample and hold capacitor in the selected row and the voltage across both terminals of the sample and hold capacitor in the predetermined row, in the third time interval, are controlled based on a timing of the vertical scan.

4. The signal reading method as claimed in claim 1, wherein the sample and hold capacitor has a capacitance smaller than that of the integrating capacitor.

5. A signal reading circuit for an image sensor, comprising: a circuit configured to successively output a read signal by scanning a voltage value of an integrating capacitor in the image sensor in which a plurality of sensor parts are arranged in a two-dimensional array made up of rows and columns and each sensor part includes the integrating capacitor accumulating a charge obtained by integrating a photocurrent output from a sensor, each of the sensor parts comprising: a sample and hold capacitor; a first switch configured to couple the sample and hold capacitor to a predetermined potential; a second switch configured to control coupling between the integrating capacitor and the sample and hold capacitor within the same sensor part; a third switch configured to control coupling between the integrating capacitor and a sample and hold capacitor within a sensor part of a different row which is different from a row in which the integrating capacitor is provided; and a fourth switch configured to mutually couple the integrating capacitor and a plurality of sample and hold capacitors through the second and third switches.

6. The signal reading circuit as claimed in claim 5, wherein the first through fourth switches within sensor parts of the same row are controlled to ON and OFF states by signals applied via signals lines that are coupled in common.

7. The signal reading circuit as claimed in claim 5, further comprising:

a shift register configured to carry out the scanning,
wherein at least one of the first, third and fourth switches in each of the sensor parts is controlled to ON and OFF states based on signals output from the shift register.

8. The signal reading circuit as claimed in claim 5, wherein the sample and hold capacitor has a capacitance smaller than that of the integrating capacitor.

9. The signal reading circuit as claimed in claim 5, wherein:

the sample and hold capacitor within the sensor part of the different row with respect to a sensor part in a first row is formed by a dummy sample and hold capacitor in a dummy row which is provided outside a layout of the two-dimensional array of the sensor parts; and the sample and hold capacitor within the sensor part of the different row with respect to a sensor part in second and subsequent rows is formed by a sample and hold capacitor within a sensor part in a row preceding the second and subsequent rows in an order of the scanning.

10. The signal reading circuit as claimed in claim 9, wherein the sample and hold capacitor within the sensor part of the different row with respect to the sensor part in second and subsequent rows is formed by a sample and hold capacitor within a sensor part in an immediately preceding row amongst the first and subsequent rows.

11. The signal reading circuit as claimed in claim 9, wherein the dummy sample and hold capacitor has a capacitance smaller than that of the integrating capacitor.

12. An image sensor comprising: a plurality of sensor parts arranged in a two-dimensional array made up of rows and columns, each of the sensor parts including an integrating capacitor accumulating a charge obtained by integrating a photocurrent output from a sensor; and a signal reading circuit configured to successively output a read signal by scanning a voltage value of the integrating capacitor in the image sensor, each of the sensor parts comprising: a sample and hold capacitor; a first switch configured to couple the sample and hold capacitor to a predetermined potential; a second switch configured to control coupling between the integrating capacitor and the sample and hold capacitor within the same sensor part; a third switch configured to control coupling between the integrating capacitor and a sample and hold capacitor within a sensor part of a different row which is different from a row in which the integrating capacitor is provided; and a fourth switch configured to mutually couple the integrating capacitor and a plurality of sample and hold capacitors through the second and third switches, wherein an output voltage representing a dynamic image is output by repeating a process of successively outputting the read signal by scanning the voltage value of the integrating capacitor in a time of one frame.

13. The image sensor as claimed in claim 12, wherein the signal reading circuit includes a shift register configured to carry out the scanning, and at least one of the first, third and fourth switches in each of the sensor parts is controlled to ON and OFF states based on signals output from the shift register.

14. The image sensor as claimed in claim 12, wherein the sample and hold capacitor has a capacitance smaller than that of the integrating capacitor.

15. The image sensor as claimed in claim 12, wherein:
the sample and hold capacitor within the sensor part of the different row with respect to a sensor part in a first row is formed by a dummy sample and hold capacitor in a dummy row which is provided outside a layout of the two-dimensional array of the sensor parts; and
the sample and hold capacitor within the sensor part of the different row with respect to a sensor part in second and subsequent rows is formed by a sample and hold capacitor within a sensor part in a row preceding the second and subsequent rows in an order of the scanning.

16. The image sensor as claimed in claim 15, wherein the sample and hold capacitor within the sensor part of the different row with respect to the sensor part in second and subsequent rows is formed by a sample and hold capacitor within a sensor part in an immediately preceding row amongst the first and subsequent rows.

17. The image sensor as claimed in claim 15, wherein the dummy sample and hold capacitor has a capacitance smaller than that of the integrating capacitor.

* * * * *